US012498829B1

(12) United States Patent
Lin et al.

(10) Patent No.: US 12,498,829 B1
(45) Date of Patent: Dec. 16, 2025

(54) TEMPERATURE DETECTING METHOD FOR TOUCH DISPLAY PANEL

(71) Applicant: Novatek Microelectronics Corp., Hsinchu (TW)

(72) Inventors: Chen-Yu Lin, Taipei (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/818,621

(22) Filed: Aug. 29, 2024

(51) Int. Cl.
*G06F 3/044* (2006.01)
*G01K 1/00* (2006.01)

(52) U.S. Cl.
CPC ............... *G06F 3/044* (2013.01); *G01K 1/00* (2013.01)

(58) Field of Classification Search
CPC .................................. G06F 3/044; G01K 1/00
See application file for complete search history.

(56) References Cited

U.S. PATENT DOCUMENTS

| 7,791,583 | B2 | 9/2010 | Lin et al. |
| 9,053,674 | B2 | 6/2015 | Chen et al. |
| 11,315,486 | B1 | 4/2022 | Su et al. |
| 11,331,765 | B1* | 5/2022 | Sherve ................. G11B 5/1871 |
| 2007/0075951 | A1 | 4/2007 | Lin et al. |
| 2008/0224981 | A1 | 9/2008 | Shen et al. |
| 2010/0134392 | A1 | 6/2010 | Sumi |
| 2011/0063337 | A1 | 3/2011 | Lin et al. |
| 2012/0092387 | A1 | 4/2012 | Yang et al. |
| 2013/0169613 | A1 | 7/2013 | Chen et al. |
| 2015/0205436 | A1* | 7/2015 | Iwamoto ................. G06F 3/044 345/174 |
| 2016/0092029 | A1* | 3/2016 | Kim ....................... G06F 3/0418 345/174 |
| 2017/0242505 | A1* | 8/2017 | Vandermeijden ........ G01K 3/14 |
| 2017/0364192 | A1* | 12/2017 | Gui ........................ G06F 3/0418 |
| 2018/0182347 | A1 | 6/2018 | Zhang |
| 2022/0108652 | A1 | 4/2022 | Su et al. |

(Continued)

FOREIGN PATENT DOCUMENTS

| CN | 114387910 | 4/2022 |
| CN | 116597794 | 8/2023 |

(Continued)

OTHER PUBLICATIONS

Qiujie Su et al., "P-180: Dynamic Invocation of Liquid Crystal Overdrive Tables by Utilizing Temperature Sensor Integrated in the LCD Cell", SID Symposium Digest of Technical Papers, Jul. 2024, pp. 1-4.

(Continued)

*Primary Examiner* — Hong Zhou
(74) *Attorney, Agent, or Firm* — JCIPRNET

(57) ABSTRACT

A temperature detecting method is disclosed. The temperature detecting method is adapted to a touch display panel and includes the following steps. The touch display panel includes a controller and multiple touch sensors. The controller obtains raw data according to touch sensing signals output from the touch sensors during a temperature sensing period. The controller calculates multiple temperature values at multiple regions of the touch display panel, according to the raw data and lookup information. The controller outputs a temperature detecting result including the temperature values.

10 Claims, 8 Drawing Sheets

(56) References Cited

U.S. PATENT DOCUMENTS

| | | | |
|---|---|---|---|
| 2022/0229504 A1* | 7/2022 | Withers | G06F 3/047 |
| 2022/0317818 A1* | 10/2022 | Furukawa | G06F 3/0412 |
| 2023/0098236 A1 | 3/2023 | Tadele et al. | |
| 2023/0186837 A1 | 6/2023 | Hyeon et al. | |
| 2024/0152228 A1 | 5/2024 | Lee et al. | |
| 2024/0265852 A1 | 8/2024 | Cho et al. | |
| 2024/0310949 A1* | 9/2024 | Jung | G06F 3/0418 |

FOREIGN PATENT DOCUMENTS

| | | |
|---|---|---|
| CN | 118471109 | 8/2024 |
| TW | I310169 | 5/2009 |
| TW | 201218151 | 5/2012 |
| TW | 201329944 | 7/2013 |
| TW | I660300 | 5/2019 |
| TW | 202420050 | 5/2024 |

OTHER PUBLICATIONS

"Office Action of Taiwan Counterpart Application", issued on Mar. 7, 2025, p. 1-p. 7.
"Office Action of Taiwan Related Application, Application No. 113149162", issued on Sep. 25, 2025, p. 1-p. 6.

* cited by examiner

TEMPERATURE DETECTING METHOD FOR TOUCH DISPLAY PANEL

BACKGROUND

Technical Field

This disclosure relates to a detecting method, and in particular to a temperature detecting method adapted to a touch display panel.

Description of Related Art

In general, the display panel is configured to implement a temperature detecting function by a temperature detector. The temperature detector may be a detecting circuit arranged in a driving integrated circuit (IC) of the display panel. However, the display panel merely obtains one detected temperature value at the whole panel area by the current temperature detector. As such, the display panel cannot detect the temperature at different regions of the display panel.

SUMMARY

Embodiments of the disclosure provide a temperature detecting method, adapted to a touch display panel, and capable of obtaining various temperature values at different regions.

The temperature detecting method of the embodiment of the disclosure includes the following steps. The touch display panel includes a controller and a plurality of touch sensors. The controller obtains raw data according to touch sensing signals output from the touch sensors during a temperature sensing period. The controller calculates a plurality of temperature values at a plurality of regions of the touch display panel, according to the raw data and lookup information. The controller outputs a temperature detecting result including the temperature values.

Based on the above, in the temperature detecting method of the embodiment of the disclosure, based on the lookup information, by performing the calculation on the raw data corresponding to the touch sensors, the controller generates various temperature values at different regions. As such, the touch display panel is capable of detecting the temperature values at the corresponding regions without a temperature detector.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
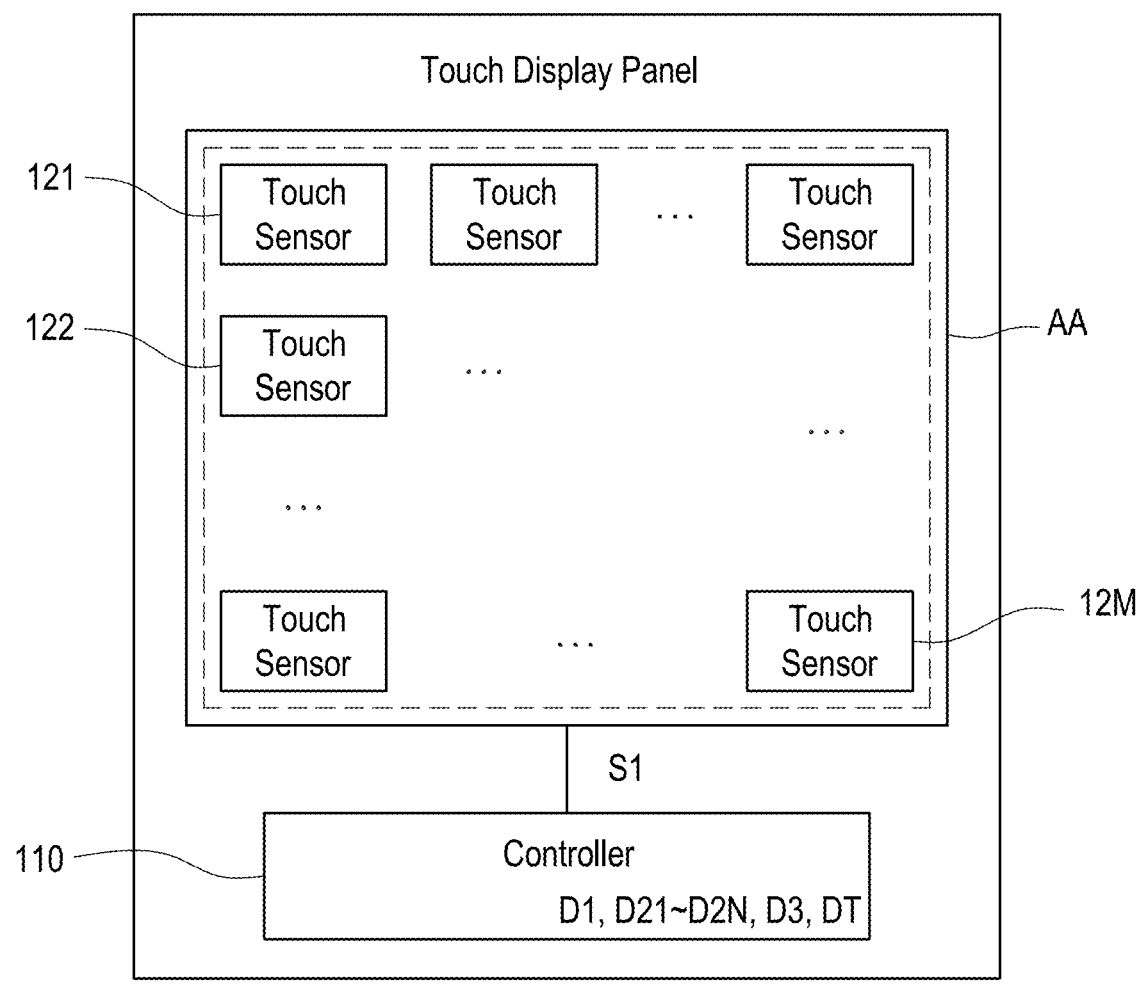
FIG. 1 is a circuit block diagram of a touch display panel according to an embodiment of the disclosure.

Some embodiments of the disclosure will be described in detail below with reference to the accompanying drawings. The reference numerals cited in the following description will be regarded as the same or similar elements when the same reference numeral appears in different drawings. These embodiments are only part of the disclosure and do not disclose all possible implementations of the disclosure. Rather, these embodiments are merely examples within the scope of the disclosure.

FIG. 1 is a circuit block diagram of a touch display panel according to an embodiment of the disclosure. Referring to FIG. 1, a touch display panel 100 may implement multiple functions, such as a touching function, a displaying function and a temperature detecting function. The touch display panel 100 includes a controller 110 and a plurality of touch sensors 121 to 12M, wherein M is a positive integer. The touch display panel 100 further includes a pixel circuit (not shown). The touch sensors 121 to 12M and the pixel circuit are respectively coupled to the controller 110.

In this embodiment, the touch sensors 121 to 12M are arranged at an active area AA of the touch display panel 100. Specifically, the touch sensors 121 to 12M are arranged at a plurality of regions of the active area AA. One region may be an area where one touch sensor (e.g., the touch sensor 121) is located. Alternatively, one region may be an area where multiple touch sensors (e.g., the touch sensors 121 and 122) are located. The touch sensors 121 to 12M are arranged in an array, and have the same circuit architecture.

In this embodiment, the pixel circuit is arranged at the active area AA. The pixel circuit is controlled ty the controller 110 to implement the displaying function. The pixel circuit may be, for example, applied with a liquid crystal display (LCD), a light-emitting diode (LED), an organic light-emitting diode (OLED), or other displaying elements that provide the displaying function.

In this embodiment, the controller 110 may be, for example, a microcontroller, a signal converter, a field programmable gate array (FPGA), a central processing unit (CPU), other programmable general purpose or special-purpose microprocessor, a digital signal processor (DSP), a programmable controller, an application specific integrated circuits (ASIC), a programmable logic device (PLD), other similar devices, or a combination of the foregoing, which may load and execute computer program-related firmware or software to implement drive, control, access, and various calculation functions.

Figure 2:
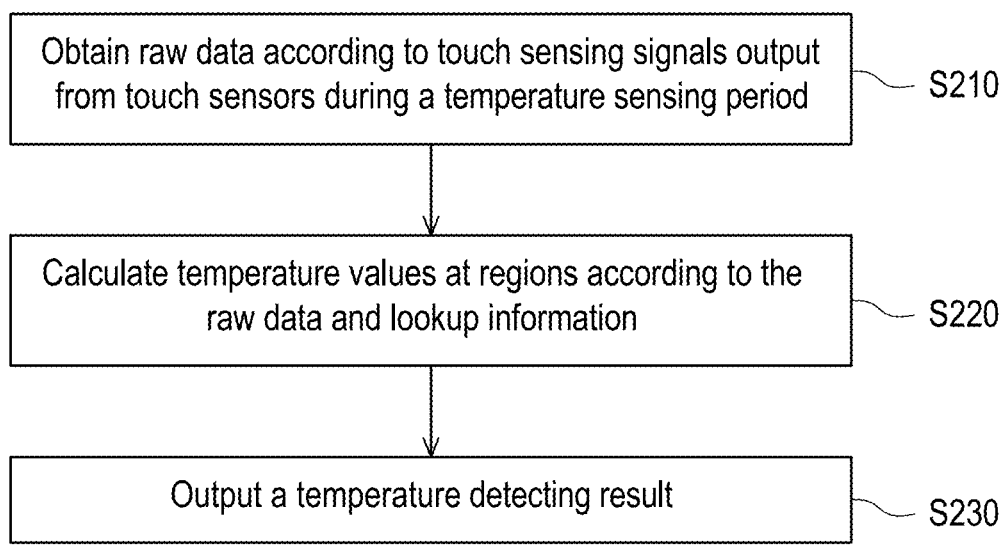
FIG. 2 is a flow chart of a temperature detecting method according to an embodiment of the disclosure.

FIG. 2 is a flow chart of a temperature detecting method according to an embodiment of the disclosure. Referring to FIGS. 1 and 2, the touch display panel 100 may execute the following steps S210 to S230. The order of these steps S210 to S230 is only for illustration and not limited thereto.

In step S210, the controller 110 obtains raw data D1 according to touch sensing signals S1 output from the touch sensors 121 to 12M during a temperature sensing period. The temperature sensing period is a period without driving the pixel circuit. For example, the temperature sensing period may be a touch sensing period, or a porch period.

In this embodiment, the touch sensing signals S1 are signals sensed by the touch sensors 121 to 12M without a touch event. The raw data D1 is digital data corresponding to the touch sensing signals S1. That is, the raw data D1 indicates baseline values of the touch sensors 121 to 12M at the current temperature.

Alternatively stated, during the period without the touch event and the driven pixel circuit (i.e., the temperature sensing period), the controller 110 receives the touch sensing signals S1 output from the touch sensors 121 to 12M. Then, the controller 110 converts the touch sensing signals S1 into the raw data D1.

In step S220, the controller 110 calculates a plurality of temperature values D21 to D2N at multiple regions of the touch display panel 100, according to the raw data D1 and lookup information DT. N is a positive integer.

In this embodiment, the lookup information DT indicates a correspondence between the baseline value without the touch event and temperature of the touch display panel 100. The quantities of the temperature values D21 to D2N and the quantities of the regions are the same.

Alternatively stated, based on the correspondence (e.g., the lookup information DT), the controller 110 performs the calculation on the raw data D1 to generate multiple temperature values D21 to D2N at the corresponding regions. The temperature values D21 to D2N indicates the current temperature at different regions respectively.

In step S230, the controller 110 outputs a temperature detecting result D3. The temperature detecting result D3 includes the temperature values D21 to D2N calculated at the step S220. The temperature detecting result D3 indicates a current temperature distribution of the touch display panel 100.

It is worth mentioning that, since the raw data D1 indicates the baseline values of the touch sensors 121 to 12M at the current temperature, based on the lookup information DT, the controller 110 is capable of calculating multiple temperature values D21 to D2N corresponding to the touch sensors 121 to 12M that arranged at various regions. As such, the touch display panel 100 is capable of detecting the temperature values D21 to D2N at different regions, and is capable of omitting a circuit layout and an operation of the temperature detector.

Figure 3:
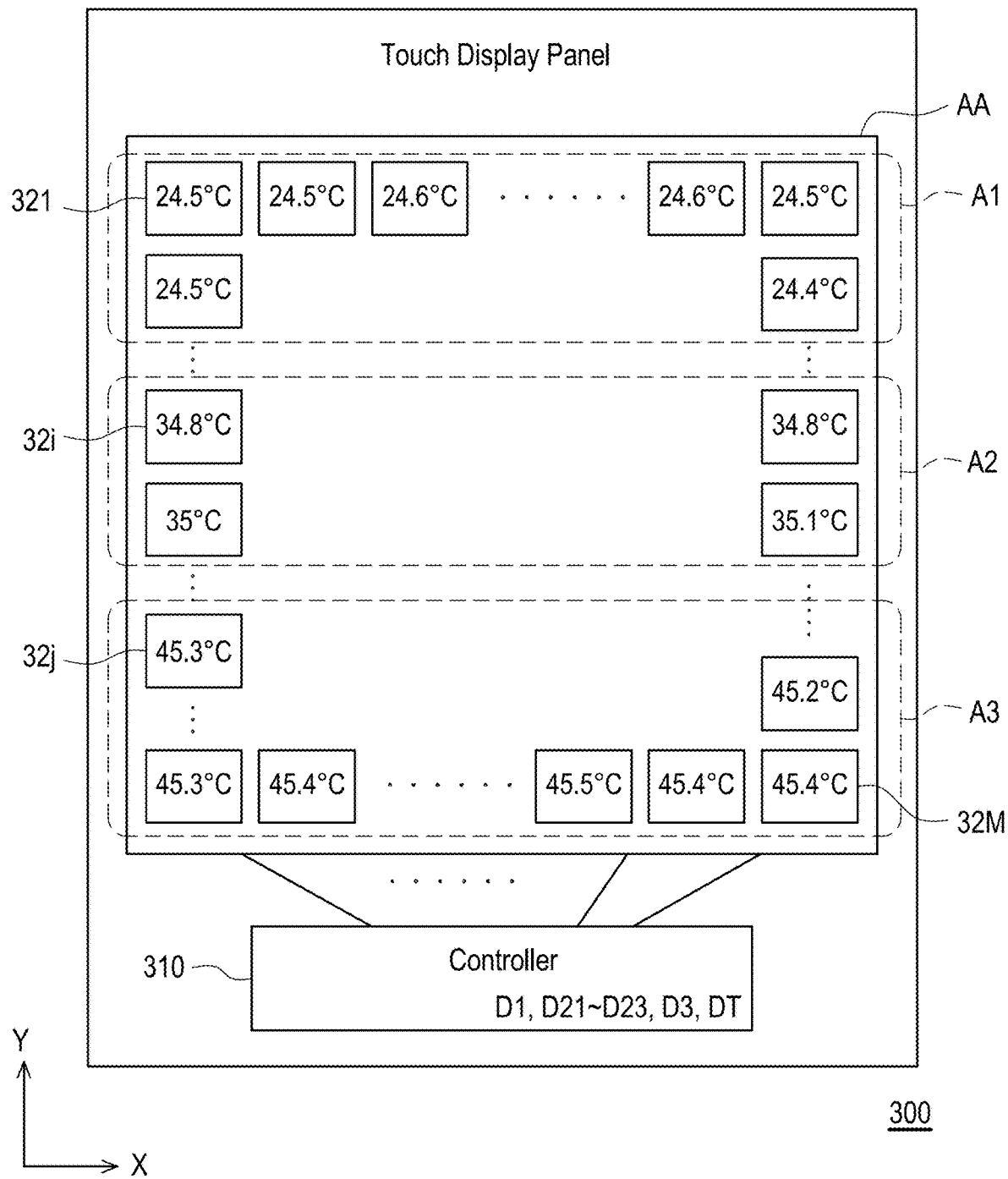
FIG. 3 is a circuit block diagram of a touch display panel according to another embodiment of the disclosure.

FIG. 3 is a circuit block diagram of a touch display panel according to another embodiment of the disclosure. Referring to FIG. 3, a touch display panel 300 includes a controller 310, multiple touch sensors 321 to 32M and a pixel circuit (not shown), wherein M is a positive integer. The controller 310, the touch sensors 321 to 32M and the pixel circuit may be described with reference to and by analogy with the touch display panel 100.

In the embodiment of FIG. 3, the pixel circuit may be, for example, applied with the LCD. The controller 310 may be, for example, a touch with display driver integrated circuit (TDDI).

Figure 4:
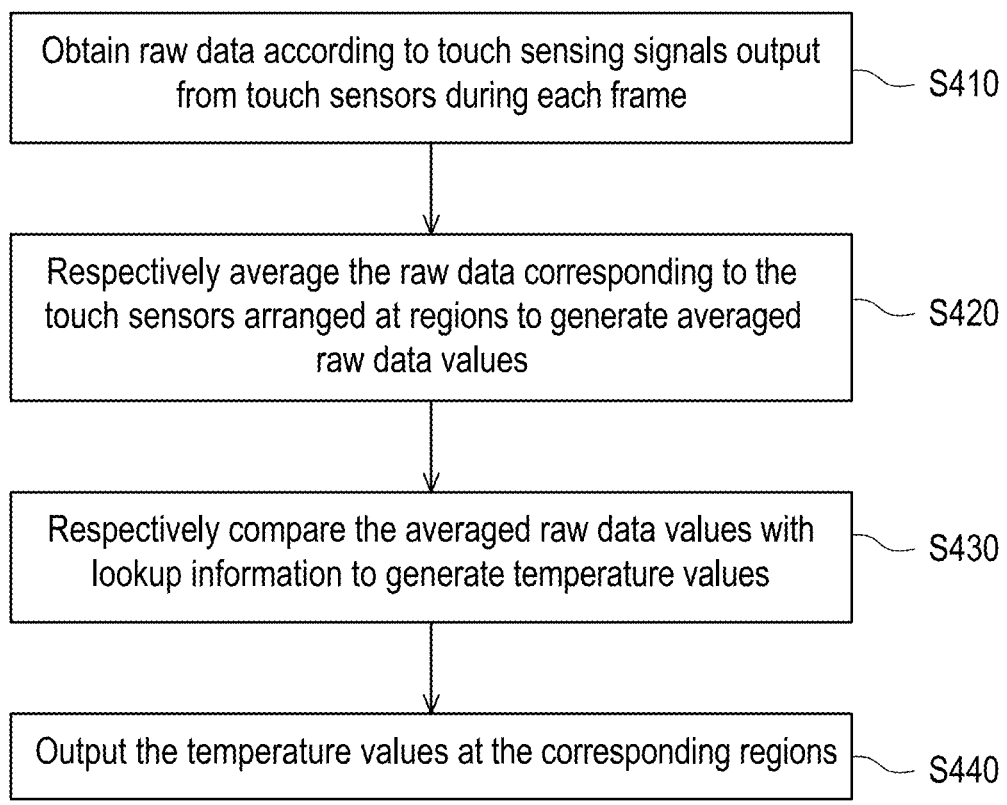
FIG. 4 is a flow chart of a temperature detecting method according to the embodiment of FIG. 3.

FIG. 4 is a flow chart of a temperature detecting method according to the embodiment of FIG. 3. Referring to FIGS. 3 and 4, the touch display panel 300 may execute the following steps S410 to S440. The order of these steps S410 to S440 is only for illustration and not limited thereto.

In step S410, the controller 310 obtains the raw data D1 according to touch sensing signals (e.g., the touch sensing signals S1 shown in FIG. 1) output from the touch sensors 321 to 32M during each frame. One of the raw data D1 is obtained according to one of the touch sensing signals, and corresponds to one of the touch sensors 321 to 32M.

In this embodiment, each frame includes one temperature sensing period. Each frame further includes at least one porch period and one displaying period. These periods during the same frame are not overlapped with each other, and have respective operations.

Specifically, in this embodiment, the temperature sensing period is a period when the touch sensors 321 to 32M perform a touch sensing operation. That is, during the temperature sensing period, the controller 310 drives the touch sensors 321 to 32M to implement at least one of the touching function and the temperature detecting function. The temperature sensing period may be a touch sensing period.

In addition, during the porch period, the controller 310 outputs at least one synchronous clock signal. During the displaying period, the controller 310 drives the pixel circuit to implement the displaying function.

Alternatively, in another embodiment, the temperature sensing period is a period excluding from with the displaying period. The temperature sensing period may be a porch period.

In this embodiment, during the touch sensing period (i.e., the temperature sensing period), the controller 310 determines whether to perform a touching method or the temperature detecting method, according to a magnitude order of the obtained raw data D1. When the magnitude order of the raw data D1 is not lower than a default magnitude order, it represents that the raw data D1 indicates the baseline values of the touch sensors 321 to 32M with the touch event. As such, the controller 310 determines to perform the touching method for outputting the corresponding report coordinates.

On the other hand, when the magnitude order of the raw data D1 is lower than the default magnitude order, it represents that the raw data D1 indicates the baseline values of the touch sensors 321 to 32M without the touch event, and further indicates the current temperature of the touch sensors 321 to 32M. As such, the controller 310 determines to perform the temperature detecting method as the following steps S420 to S440.

In this embodiment, the default magnitude order may be a default value to determine whether the raw data D1 corresponds to a signal-to-ratio (SNR) that is large enough. That is, the default magnitude order is used for distinguishing whether any touch event happens.

Alternatively, in another embodiment, during the touch sensing period (i.e., the temperature sensing period), the controller 310 performs the touching method and the temperature detecting method at the same time. Specifically, the controller 310 determines at least one region where the touch event happens (e.g., a region A1), according to the magnitude order of the obtained raw data D1. The controller 310 performs the touching method on the determined region A1 with the touch event, and also performs the temperature detecting method on the remaining region (e.g., regions A2 and A3) without the touch event.

Continued with the step S410, the controller 310 divides the active area AA into multiple regions A1 to A3. The quantities of the regions A1 to A3 are only examples. With respect to a Y-direction, the regions A1 to A3 are adjacent sequentially.

In this embodiment, each one of the regions A1 to A3 has a number of the touch sensors 321 to 32M. Specifically, some of the touch sensors 321 to 32M (e.g., including the touch sensor 321) are arranged in the region A1. Some of the touch sensors 321 to 32M (e.g., including the touch sensor 32i) are arranged in the region A2, and the others (e.g., including the touch sensor 32j) are arranged in the region A3.

In detail, the controller 310 divides the active area AA into these regions A1 to A3 according to distances between the touch sensors 321 to 32M and the controller 310. In this embodiment, with respect to the Y-direction, relative to the controller 310, the region A1 may be, for example, a far-end region, the region A2 may be, for example, a middle-end region, and the region A3 may be, for example, a near-end region. Alternatively, the controller 310 divides the active area AA into multiple regions A1 to A3 according to the design requirement of the touch display panel 300.

For example, with respect to the Y-direction, since each one of the distances between the touch sensors in the region A1 (e.g., the touch sensor 321) and the controller 310 is greater than a first default distance and a second default distance, the controller 310 sets an area where these touch sensors are located as the region A1. With respect to the Y-direction, since each one of the distances between the touch sensors in the region A2 (e.g., the touch sensor 32i) and the controller 310 is greater than the first default distance and is less than the second default distance, the controller 310 sets an area where these touch sensors are located as the region A2. With respect to the Y-direction, since each one of the distances between the touch sensors in the region A3 (e.g., the touch sensor 32j) and the controller 310 is less than the first default distance and the second default distance, the controller 310 sets an area where these touch sensors are located as the region A3. The various default distances are preset according to the design requirement.

In this embodiment, the controller 310 further respectively collects the raw data D1 corresponding to the touch sensors 321 to 32M arranged at the regions A1 to A3. Alternatively stated, the controller 310 collects the raw data D1 corresponding to the touch sensors (e.g., including the touch sensor 321) arranged at the region A1, in order to calculate the temperature value at such region A1. The collected raw data D1 from the regions A2 and A3 may be described with reference to and by analogy with the collected raw data D1 from the region A1.

Continuously, the controller 310 executes steps S420 and S430, to illustrate the detail of the step S220 in FIG. 2. In step S420, the controller 310 respectively averages the raw data D1 corresponding to the touch sensors 321 to 32M arranged at the regions A1 to A3 to generate a plurality of averaged raw data values. Each one of the average raw data values indicates an average value of the raw data D1 from the respective regions A1 to A3.

Figure 5:
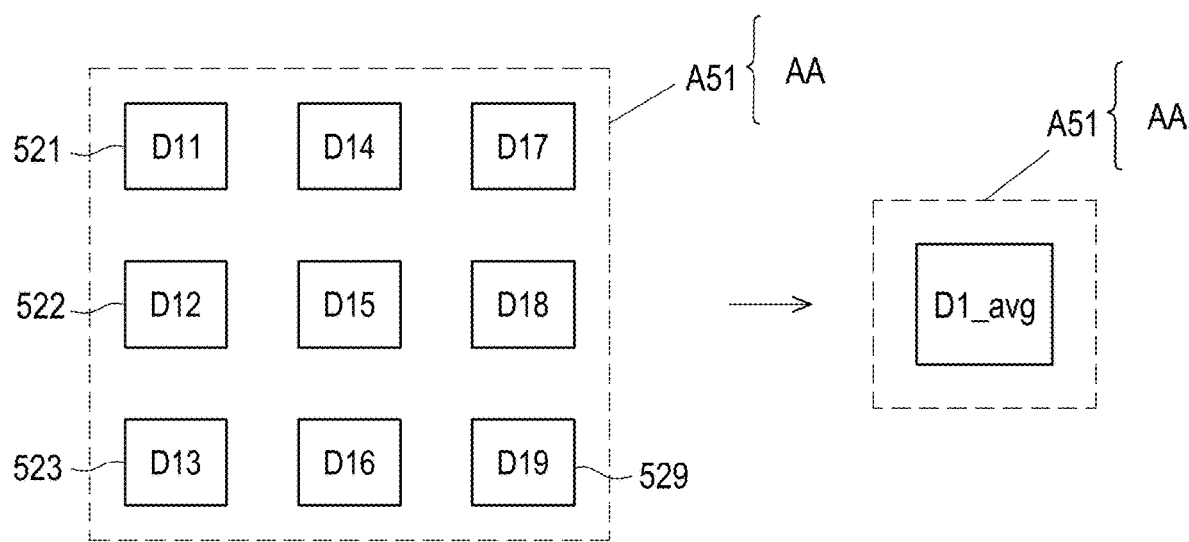
FIG. 5 is a schematic diagram of operations of the touch display panel according to the embodiment of FIG. 3 of the disclosure.

For example, referring to FIG. 3 and FIG. 5, FIG. 5 is a schematic diagram of operations of the touch display panel according to the embodiment of FIG. 3 of the disclosure. Assumed that multiple touch sensors 521 to 529 are arranged at the same divided region A51. These touch sensors 521 to 529 and the region A51 may be described with reference to and by analogy with the touch sensors 321 to 32M and the region A1.

In the embodiment of FIG. 5, in the same region A51, the controller 310 collects the raw data D11 to D19 respectively corresponding to the touch sensors 521 to 529. The controller 310 averages these raw data D11 to D19 to generate the averaged raw data value D1_avg. Since each one of the raw data D11 to D19 indicates one baseline value of the respective touch sensors 521 to 529 without the touch event, the averaged raw data value D1_avg indicates an averaged baseline value of these sensors 521 to 529 without the touch event, and further indicates the current averaged temperature of these sensors 521 to 529.

Back to FIGS. 3 and 4, the controller 310 obtains multiple (e.g., 3) averaged raw data values corresponding to the regions A1 and A3. These averaged raw data values respectively indicate the current averaged temperature of the corresponding touch sensors 321 to 32M.

In step S430, the controller 310 respectively compares the averaged raw data values with the lookup information DT to generate the temperature values D21 to D23. The temperature values D21 to D23 respectively indicate the current temperature of the regions A1 to A3.

Figure 6:
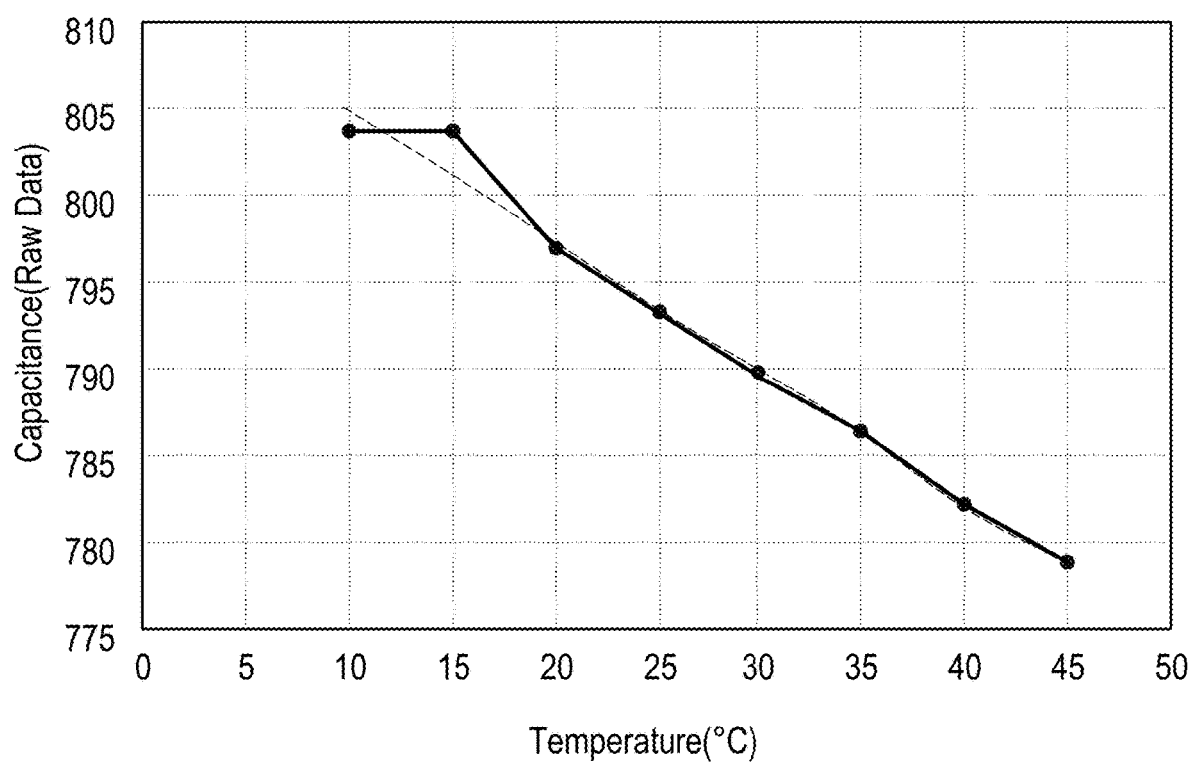
FIG. 6 is a schematic diagram of the lookup information according to the embodiment of FIG. 3 of the disclosure.

FIG. 6 is a schematic diagram of the lookup information according to the embodiment of FIG. 3 of the disclosure. Referring to FIG. 3 and FIG. 6, the controller 310 stores the lookup information DT. The lookup information DT may be, for example, represented as a lookup table, an equation, a diagram or other transforming information between the raw data D1 and the temperature. In FIG. 6, the lookup information DT is represented as a two-dimensional diagram. The horizontal axis represents the temperature of the touch display panel 300, and the vertical axis represents the capacitance of the touch display panel 300.

In the embodiment of FIG. 6, the lookup information DT includes a correlation between capacitance of the touch sensors 321 to 32M and temperature. The capacitance of the touch sensors 321 to 32M is referred to the averaged parasitic capacitance thereof, and is represented as the following equation (1). In the equation (1), Cs represents the parasitic capacitance of each touch sensors 321 to 32M, ε represents a permittivity of the medium of each touch sensors 321 to 32M, A represents an area of each touch sensors 321 to 32M, and d represents a thickness of the medium.

$$Cs = \varepsilon \frac{A}{d} \qquad \text{equation (1)}$$

It should be noted that, since the baseline values of the touch sensors 321 to 32M at the certain temperature have a positive correlation with the parasitic capacitances of the touch sensors 321 to 32M, the raw data D1 also indicates the parasitic capacitances of the touch sensors 321 to 32M. As such, the lookup information DT indicates the correlation between the raw data D1 (i.e., the capacitance of the touch sensors 321 to 32M) and the temperature. The raw data D1 of the lookup information DT is referred to an averaged raw data of the touch sensors 321 to 32M, which is the raw data of the whole touch display panel 300.

Furthermore, the correlation of the lookup information DT is associated with a material of the touch sensors 321 to 32M. In this embodiment, since the pixel circuit is applied with the LCD, the touch sensors 321 to 32M may be, for example, applied with an indium tin oxide (ITO) material or other transparent conductive materials.

Specially, when the material of the touch sensors 321 to 32M includes a metal oxide material (e.g., ITO material), the touch sensors 321 to 32M has low sensitivity to the temperature. Based on the above equation (1), when the temperature changes (e.g., increases), a variation of the area "A" is less than a variation of the thickness "d", and the parasitic capacitance "Cs" decreases accordingly. As such, the capacitance of the touch sensors 321 to 32M and the temperature have a negative correlation.

Back to FIGS. 3 and 4, the controller 310 obtains multiple (e.g., 3) temperature values D21 to D23 at the regions A1 to A3. These temperature values D21 to D23 respectively indicate the current averaged temperatures at the regions A1 to A3.

It should be noted that, since the controller 310 generates thermal energy when the touch display panel 300 is working, the near-end region (i.e., the region A3) has a higher temperature than the temperature at the far-end region (i.e., the region A1). By calculating the temperature values D21 to D23 at different regions A1 to A3 based on the collected raw data D1 from various regions A1 to A3 and the lookup information DT, the controller 310 is capable of detecting the current temperature at each one of the regions A1 to A3, and is further capable of detecting the temperature difference between these regions A1 to A3.

In step S440, the controller 310 outputs the temperature values D21 to D23 at the corresponding regions A1 to A3. Alternatively, the controller 310 generates the temperature detecting result D3 according to the temperature values D21 to D23, and outputs the temperature detecting result D3. The temperature detecting result D3 includes at least one of the temperature values D21 to D23, based on an instruction of the touch display panel 300.

Figure 7:
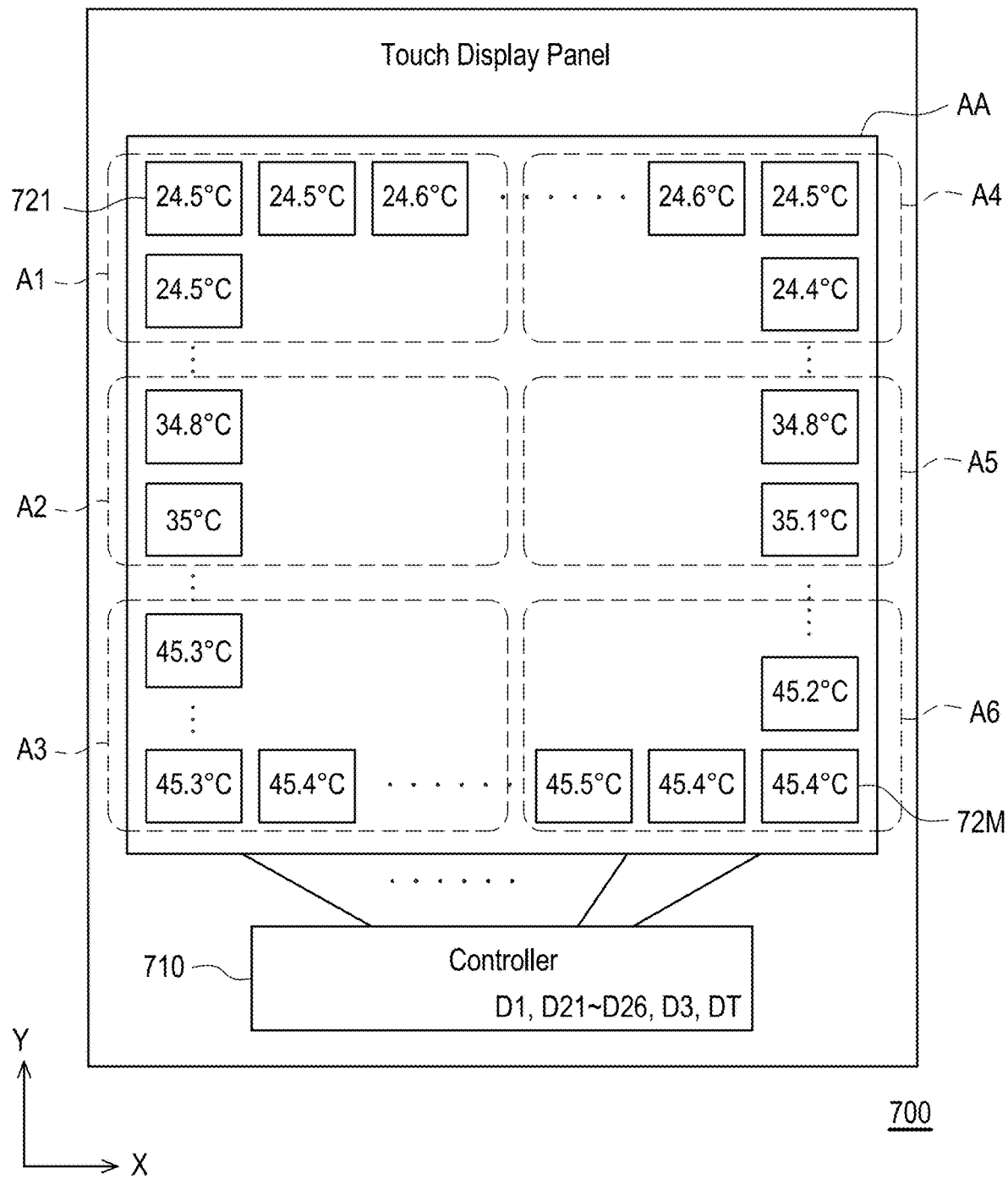
FIG. 7 is a circuit block diagram of a touch display panel according to another embodiment of the disclosure.

FIG. 7 is a circuit block diagram of a touch display panel according to another embodiment of the disclosure. Referring to FIG. 7, a touch display panel 700 includes a controller 710, multiple touch sensors 721 to 72M and a pixel circuit (not shown), wherein M is a positive integer. The controller 710, the touch sensors 721 to 72M and the pixel circuit may be described with reference to and by analogy with the touch display panel 100 or the touch display panel 300.

Compared with the embodiment of FIG. 3, in the embodiment of FIG. 7, the pixel circuit may be, for example, applied with the OLED. In addition, based on the design requirement, the controller 710 divides the active area AA into multiple (e.g., 6) regions A1 to A6.

Figure 8:
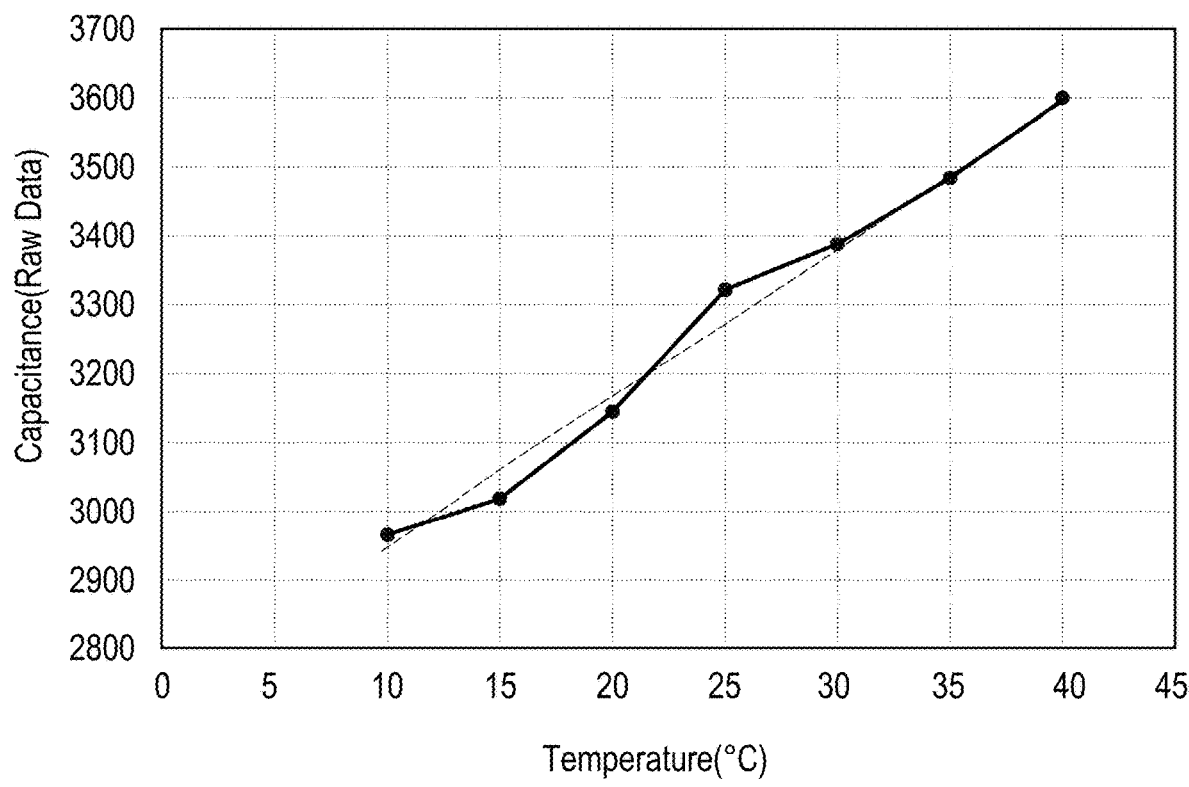
FIG. 8 is a schematic diagram of the lookup information according to the embodiment of FIG. 7 of the disclosure.

FIG. 8 is a schematic diagram of the lookup information according to the embodiment of FIG. 7 of the disclosure. Referring to FIG. 7 and FIG. 8, based on the lookup information DT, the touch display panel 700 may perform the temperature detecting method as described in the embodiment of FIG. 4. The foresaid temperature detecting method may be described with reference to and by analogy with the steps S410 to S440 executed by the touch display panel 300.

In FIG. 8, the lookup information DT is represented as a two-dimensional diagram. The horizontal axis represents the temperature of the touch display panel 700, and the vertical axis represents the capacitance of the touch display panel 700.

In this embodiment, since the pixel circuit is applied with the OLED, the touch sensors 721 to 72M may be, for example, applied with a metal mesh structure or other conductive structures. Specially, when the material of the touch sensors 721 to 72M includes a metal material (e.g., metal mesh structure), the touch sensors 721 to 72M has high sensitivity to the temperature. Based on the above equation (1), when the temperature changes (e.g., increases), a variation of the area "A" is greater than a variation of the thickness "d", and the parasitic capacitance "Cs" increases accordingly. As such, the capacitance of the touch sensors 721 to 72M and the temperature have a positive correlation.

In this embodiment, based on the collected raw data D1 from various regions A1 to A6 and the lookup information DT, the controller 710 calculates multiple (e.g., 6) temperature values D21 to D26 at the regions A1 to A6. These temperature values D21 to D26 respectively indicate the current averaged temperatures at the regions A1 to A6. Then, the controller 710 outputs at least one of the temperature values D21 to D26 at the corresponding regions A1 to A6 as the temperature detecting result D3, based on an instruction of the touch display panel 700. Thereby, the controller 710 is capable of detecting the current temperature at each one of the regions A1 to A6, and is further capable of detecting the temperature difference between these regions A1 to A6.

To sum up, in the temperature detecting method of the embodiments of the disclosure, based on the correlation between capacitance of the touch sensors and temperature (i.e., the lookup information), by performing the calculation on the raw data corresponding to the touch sensors, the controller generates various temperature values at different regions. Therefore, without the temperature detector, the touch display panel is capable of detecting the temperature values at the different regions. In some embodiments, by calculating the temperature values based on the collected raw data from various regions and the lookup information, the touch display panel is capable of detecting the current temperature at each one of the regions, and is further capable of detecting the temperature difference therebetween.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A temperature detecting method, adapted to a touch display panel which comprises a controller and a plurality of touch sensors, wherein the temperature detecting method comprises:
    obtaining, by the controller, raw data according to touch sensing signals output from the plurality of touch sensors during a temperature sensing period;
    determining, by the controller, to perform the temperature detecting method on a region of the touch display panel, and to perform a touching method on a remaining region of the touch display panel at the same time, according to magnitude order of the raw data;
    calculating, by the controller, a plurality of temperature values at a plurality of regions of the touch display panel, according to the raw data and lookup information; and
    outputting, by the controller, a temperature detecting result comprising the plurality of temperature values.

2. The temperature detecting method according to claim 1, wherein a step of calculating the plurality of temperature values at the plurality of regions according to the raw data and the lookup information comprises:
    respectively averaging, by the controller, the raw data corresponding to the plurality of touch sensors arranged at the plurality of regions to generate a plurality of averaged raw data values;
    respectively comparing, by the controller, the plurality of averaged raw data values with the lookup information to generate the plurality of temperature values.

3. The temperature detecting method according to claim 1, further comprising:
    dividing, by the controller, an active area of the touch display panel into the plurality of regions; and respectively collecting, by the controller, the raw data corresponding to the plurality of touch sensors arranged at the plurality of regions.

4. The temperature detecting method according to claim 3, wherein the controller divides the active area into the plurality of regions according to distances between the plurality of touch sensors and the controller.

5. The temperature detecting method according to claim 3, wherein each one of the plurality of regions has a number of the plurality of touch sensors.

6. The temperature detecting method according to claim 1, wherein the lookup information comprises a correlation between capacitance of the plurality of touch sensors and temperature.

7. The temperature detecting method according to claim 6, wherein the correlation is associated with a material of the plurality of touch sensors.

8. The temperature detecting method according to claim 7, wherein when the material of the plurality of touch sensors includes a metal oxide material, the capacitance of the plurality of touch sensors and the temperature have a negative correlation.

9. The temperature detecting method according to claim 7, wherein when the material of the plurality of touch sensors includes a metal material, the capacitance of the plurality of touch sensors and the temperature have a positive correlation.

10. The temperature detecting method according to claim 1, wherein the temperature sensing period is a period when the plurality of touch sensors perform a touch sensing operation.

* * * * *